(12) United States Patent
Maeda et al.

(10) Patent No.: US 8,750,564 B2
(45) Date of Patent: Jun. 10, 2014

(54) CHANGING PARAMETERS OF SEQUENTIAL VIDEO FRAMES TO DETECT DIFFERENT TYPES OF OBJECTS

(75) Inventors: Patrick Yasuo Maeda, Mountain View, CA (US); Martin Edward Hoover, Rochester, NY (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 361 days.

(21) Appl. No.: 13/315,032

(22) Filed: Dec. 8, 2011

(65) Prior Publication Data

US 2013/0148846 A1 Jun. 13, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| 4,647,975 | A | 3/1987 | Alston et al. |
| 6,650,765 | B1 | 11/2003 | Alves |
| 7,016,518 | B2 | 3/2006 | Vernon |
| 7,825,829 | B2 | 11/2010 | Madsen |
| 2009/0160937 | A1 | 6/2009 | Son |
| 2009/0161913 | A1 | 6/2009 | Son |
| 2009/0202105 | A1 | 8/2009 | Castro Abrantes et al. |
| 2013/0066542 | A1* | 3/2013 | Chung .......................... 701/119 |

FOREIGN PATENT DOCUMENTS

WO    WO 2009018647 A1 *  2/2009

OTHER PUBLICATIONS

Saha, Satadal, et al. "Development of an Automated Red Light Violation Detection System (RLVDS) for Indian vehicles." arXiv preprint arXiv:1003.6052 (2010).*

* cited by examiner

*Primary Examiner* — Stephen R Koziol
*Assistant Examiner* — Raphael Schwartz
(74) *Attorney, Agent, or Firm* — Hollingsworth Davis, LLC

(57) ABSTRACT

First and second camera parameters are optimized for detecting a respective retroreflective and non-retroreflective object. A sequential series of first and second video frames are captured based on the first and second camera parameters, and the retroreflective and non-retroreflective object are detected in a camera scene based on the respective first and second video frames of the series.

17 Claims, 6 Drawing Sheets

CHANGING PARAMETERS OF SEQUENTIAL VIDEO FRAMES TO DETECT DIFFERENT TYPES OF OBJECTS

SUMMARY

Various embodiments described herein are generally directed to methods, systems, and apparatuses that facilitate detecting different types of objects in video frames. In various embodiments, a method, system and apparatus facilitate defining first and second camera parameters optimized for detecting a respective retroreflective and non-retroreflective object. A sequential series of first and second video frames are captured based on the respective first and second camera parameters, and the retroreflective and non-retroreflective object are detected in a camera scene based on the respective first and second video frames of the series.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates generally to automated system for identifying objects, such as vehicles, license plates and the like. For example, methods, systems and apparatuses are described below that can identify both general vehicle characteristics (e.g., make, model, color) and vehicle license plates using a single camera, and can capture time resolved images for speed measurement and detection. While embodiments below are described in terms of vehicle imaging and automated license plate detection, it will be appreciated that the concepts may be applied to any imaging application where two or more objects in a scene exhibit widely different reflectivity, such that at least one of the object will tend to be underexposed or overexposed using image capture devices such as a video camera.

The embodiments herein may be usefully applied to any application where large amounts of image data are captured for automatic analysis. Such image capture may use a video camera, which is capable of capturing large numbers of images over time. For example, a traffic monitoring system may utilize a high-resolution camera video suitable for capturing multiple vehicle images simultaneously, such as across multiple lanes of traffic. A high-resolution camera may generally have lower frame rates than cameras sometimes employed in automatic license plate detection systems. However, if the high-resolution camera can be adapted to read license plates as well as generally identify vehicles, significant cost savings can be realized compared to devices that are specially tailored for one application or the other. Such an arrangement may be useful for entities engaged in surveillance and detection, and who may also desire high dynamic range imaging for evidentiary purposes, e.g., to obtain quality images of the vehicle as well as the license plate.

For purposes of this disclosure, a high-resolution video camera may be a video camera having a frame resolution of more than 1 megapixels. For example, one common high-resolution format is 2352×1728, which results in a rendered frame of 4 megapixels. The high-resolution camera may be limited to a frame of 100-300 frames per second or less. It will be appreciated that these specifications are a general guide, and may not account for differences such as interlacing, compression, color depth, etc., which can affect the amount of data contained in a particular frame. The camera lens may be a commercially available lens designed for digital cameras with focal lengths ranging from 25 mm to 300 mm and f-numbers ranging from f/1.4 to f/4. While the embodiments described below need not be limited to these camera specifications, it has been found that cost-effective yet accurate identification of different types of object can be achieved using cameras with specifications meeting at least those capabilities.

Figure 1A:
FIGS. 1A-1B are example images produced by an apparatus according to an example embodiment.
Figure 1B:

In reference now to FIGS. 1A and 1B, example images 102, 104 are shown that are produced by an apparatus according to an example embodiment. These figures illustrate how a system that images both license plates and entire vehicles may require different image capture parameters. In FIG. 1A, an image 102 of an automobile is optimized (e.g., camera integration/exposure time, illumination pulse width, camera gain, etc.) so that a license plate of the automobile is readable. This image 102 may be suitable for human or machine reading of the characters on the license plate. In FIG. 1B, another image 104 of the same vehicle taken at approximately the same time but using different parameters. This image 104 illustrates a result of optimizing the parameters for identifying general features of the vehicle. For example, image 104 may facilitate human or machine recognition of make, model, year, etc. The image 104 may also make visible other aspects useful for vehicle identification, such as color, dents/damage, bumper stickers, occupants, tire configuration, accessories, etc.

The disclosed embodiments may utilize an imaging and (optional) illumination scheme that enables video or photographic capture of resolvable license plate images contemporaneously with capture of recognizable evidentiary images of moving vehicles. For example, camera parameters (integration times, illumination pulse widths, camera gain, color settings, resolution, etc.) can be alternated between subsequent video frames to both capture resolvable license plate images and capture properly exposed vehicle images. These subsequent frames can be captured over a period of time that is sufficient to produce both types of imagery. Later, the frames can be separated and combined with like frames (e.g., combine all license plate image frames) to form a composite image suitable for identifying objects of interest.

Using this technique, the images can be captured using relatively lower frame rates as compared to cameras sometimes used in specialized license plate imaging systems. This may allow widely-available, commercial, high-resolution cameras to be used for this task. For example, a high resolution camera may allow capture of vehicle data across multiple lanes of traffic. This can result in cost savings due to a reduced number of cameras needed to cover a given traffic area.

One reason that different camera parameters may be needed to capture different types of objects is that different vehicle body parts may have widely different specular and diffuse reflectivity properties. Generally, specular reflection refers to light that reflects at a fairly constant angle over a given area, e.g., such as from a mirrored surface. Specular reflection can be distinguished from diffuse reflection, where light may reflect at widely different angles over a given area. Examples of diffuse reflecting surfaces may include matte surfaces such as sheets of paper.

License plates have specular and diffuse reflectivity properties, and the specular component may be retroreflective as well. Retroreflection refers to reflection of light back to its source with minimal scattering, e.g., the angle that the light approaches a retroreflective surface is substantially parallel to the angle of a substantial amount of the light reflected from the surface. Objects designed for easy night viewing, such as road signs and license plates, use retroreflective surfaces. In night view situations, the light source (e.g., headlights) and receiver (e.g., driver) are in close proximity, so a retroreflective object will appear bright because a significant amount of light is reflected directly back to the light's source. The night-viewable surfaces are generally formed so that the retroreflectivity occurs over a wide range of angles between the surface and the light source/receiver. This allows the surface to be visible over a wide range of light source/receiver locations.

For a camera and illumination system that produces images such as shown in FIG. 1A-1B, the camera and illuminator light source may be co-located, and the light is specularly retroreflected back to the camera from the license plate. This causes the license plate to appear much brighter than the rest of the car. This phenomenon may occur over a wide variety of view angles, due to the properties of the retroreflective surface of the license plate. Examples are shown in FIGS. 2A-2C of retroreflective structures of objects that may imaged by embodiments described herein.

Figure 2A:
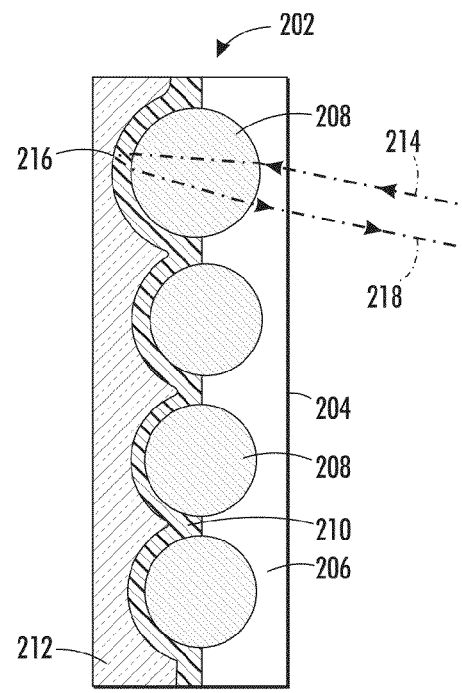
FIGS. 2A-2D are diagrams of retroreflective objects and structures that may imaged by example embodiments.

In FIG. 2A, a cross sectional view shows features of a beaded specular retroreflective object 202. A plastic outer layer 206 forms an outer viewing surface 204 of the object 202. The outer layer 206 covers glass beads 208, which are covered on the other side by an inner plastic layer 210. The inner plastic layer 210 is disposed between the beads 208 and a mirror 212. The shape of the beads 208 and mirror 212, as well as the optical properties (e.g., index of refraction) of the beads 208 and layers 206, 210, cause an incoming beam of light 214 to be refracted before being reflected off mirror 212 at point 216. The reflected beam 218 undergoes similar refractions while passing out through the bead 208 and layers 206, 210 such that the reflected beam 218 exits at an angle substantially parallel to the incoming beam 214. The spherical shape of the balls 208 and matching indentations in mirror 212 help ensure this parallelism between incident and reflected beams 214, 218 over a wide range incidence angle relative to the surface 204.

Figure 2B:
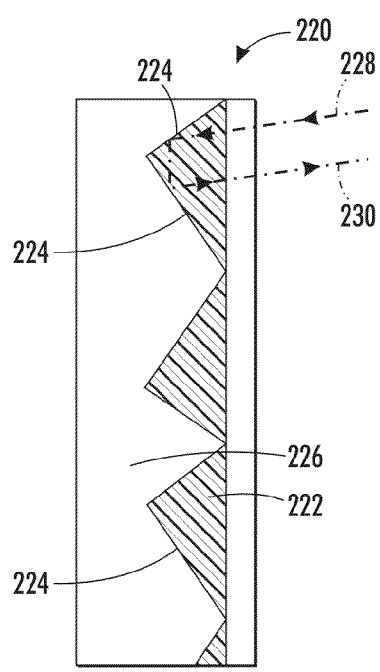
Figure 2C:
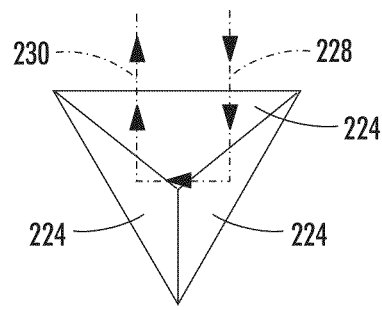

In FIG. 2B, a cross sectional view shows features of another retroreflective object 220. The object 220 uses a plastic layer 222 with angled surfaces 224 facing an air gap 226. The surfaces 224 are mirrored so that an incoming beam of light 228 is reflected by multiple surfaces 224. The surfaces 224 are arranged so that a significant number of the reflected beams 230 are parallel to the incoming light 228. In order to maintain this parallelism over a number of incident angles of the incoming light 228, the surfaces 224 may be oriented at a variety of different angles. Also, as seen in the front view of FIG. 2C, the angles of surfaces 224 may be varied in three-dimensions.

Other than the license plate (and other small objects such as safety reflectors), most car body parts do not specularly retroreflect illuminator light back to the camera. This results in a large brightness difference between the license plate and vehicle as seen from a video camera. In such a case, if the license plate exposure is satisfactory, the vehicle is underexposed (e.g., as seen in FIG. 1A). If the vehicle exposure is satisfactory, the license plate is overexposed and/or saturated and, therefore, unreadable (e.g., as seen in FIG. 1B). The present embodiments may alternate different camera integration times, illumination pulse widths, camera gain, aperture settings, etc., to capture both resolvable license plate images and also capture properly exposed vehicle images.

Figure 2D:
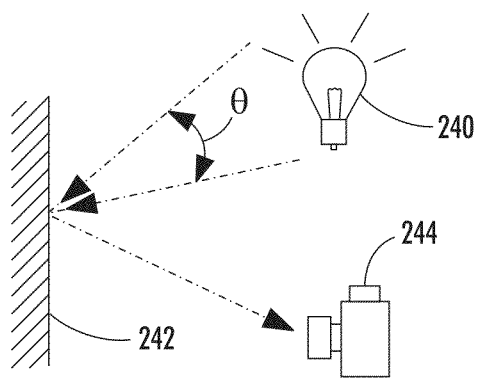

By way of example, FIG. 2D illustrates a diagram for facilitating the following discussion estimating magnitudes of specular and diffuse reflection. In this simplified diagram, a light source 240 emits light that reflects off of a surface 242. The reflected light is received by imaging device 244. An angle $\theta$ represents a size of the light source 240, e.g., a range of angles that light from the source 204 approaches a point of the surface 242. For purposes of this example, the angle $\theta$ is relatively small, e.g., 0.5 degrees, or 0.00875 radians, to represent a traffic monitoring scenario. In such a scenario, if the light source 240 was 50 meters away from the surface 242, $\theta=0.5$ degrees would correspond to a light source diameter of approximately 44 cm.

If the surface 242 is a diffuse scattering surface, then the radiance $L_{DS}$ of the surface seen by the imaging device 244 may be estimated as shown in Equation [1] below. In contrast, if surface 242 is a retroreflective scattering surface, then the radiance $L_{RS}$ of the surface seen by the imaging device 244 may be estimated as shown in Equation [2] below.

$$L_{DS}=LR_{DS}\sin^2(\theta/2) \text{ (diffuse scattering)} \quad [1]$$

$$L_{RS}=LR_{RS}\pi\sin^2(\theta/2) \text{ (retroreflective scattering)} \quad [2]$$

In both of these equations, L is the radiance of the source 240. In Equation [1], and $R_{DS}$ is reflectance of surface 242, and $R_{DS}=0.9$ is assumed for this example. If $L=7.01$ W/cm²-sr, $R_{DS}=0.9$, and $\theta=0.5$ degrees, the value of $L_{DS}$ is 0.12 mW/cm²-sr, or 0.12/7010=0.0017% of L. In Equation [2], $R_{RS}$ is the coefficient of retroreflectance, and $R_{RS}=10$ sr$^{-1}$ is assumed for purposes of this example. If $L=7.01$ W/cm²-sr, $R_{RS}=10$ sr$^{-1}$, the value of $L_{RS}$ is 4.19 mW/cm²-sr, or 0.06% of L.

The results show that, even for an average reflectance of 0.06%, the effective object brightness of a retroreflective object can be many times higher than for a diffuse reflective object (greater than 35 times higher in this case). This effective object brightness difference explains why the license plate image exposure may be much higher than the vehicle image exposure. Referring again to the example images of FIGS. 1A and 1B, the image 102 of FIG. 1A was taken with unity camera gain and results in a properly exposed license plate with an underexposed vehicle image. The image 104 in FIG. 1B was taken with a high camera gain and results in a properly exposed vehicle image with a saturated license plate image.

In the examples described herein, a system uses different parameters for adjacent video frames captured by a video camera. These video frames do not need to be directly adjacent, although adjacency may be desirable based on the available camera frame rates. It is anticipated that directly adjacent frames with different parameters, e.g., alternating frames having first and second sets of parameters applied, may provide a good image accuracy with relatively low cost hardware. In such a case, the resulting video stream contains alternating sequences of images of two or more types. The differing types of images are suitable for discerning different types of data, including a first type of image suitable for identifying license plates, and a second type of image suitable for generally vehicle identification. The differing types of images can be separated out from the stream and combined to form enhanced composite images of the first and second types.

Figure 3A:
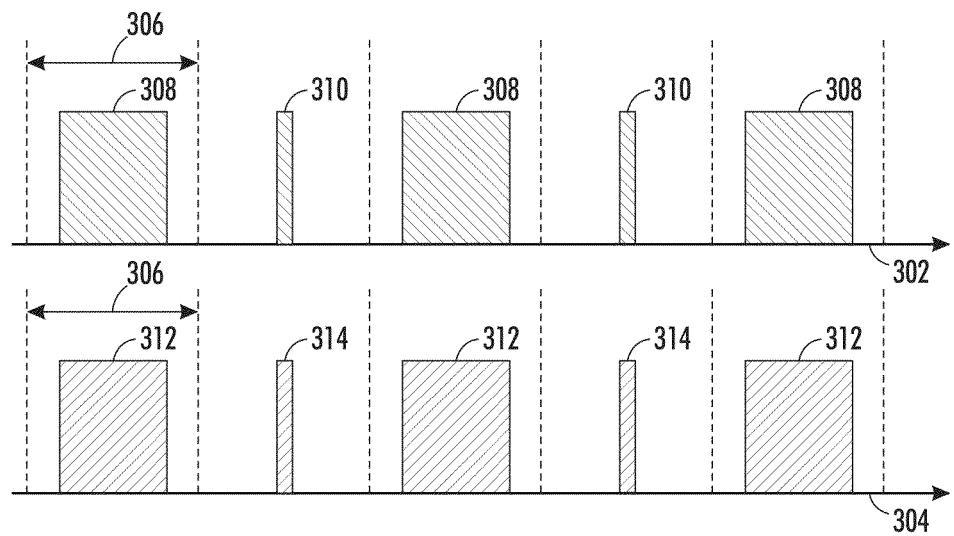
FIG. 3A-3B are timing diagrams illustrating camera and gain timing settings according to example embodiments.
Figure 3B:
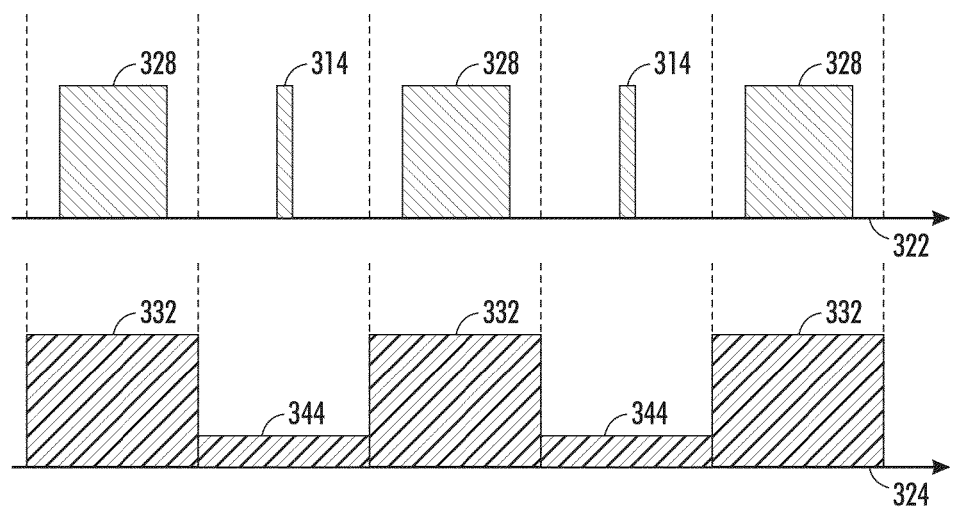

In reference now to FIGS. 3A and 3B, a series of timing diagrams illustrates how camera and illumination parameters may be varied on a per-frame basis according to an example embodiment. In FIG. 3A, timelines 302, 304 are associated with respective settings of camera integration times and illuminator pulse width per each frame. The dashed lines indicated boundaries of video frames, such as frame 306 which utilizes a combination of settings from both timelines 302, 304. In this example, the time between camera frames is constant over time. So, if the camera is set up for 100 frames per second, the time of each frame (including frame 306) would be 1/100 second.

For time line 302, curves 308 represent a first, per-frame, camera integration time (e.g., time over which the camera's light detector gathers received light to form an image) suitable for non-retroreflective objects, such as whole vehicle imaging as seen in FIG. 1B. Curves 310 represent a second, per-frame, camera integration time suitable for retroreflective objects, such as license plates as seen in FIG. 1B. The shorter integration time 310 for the license plate image capture reduces the image smear and yields a resolvable and readable license plate image. The camera integration times 308 may vary between 5 to 50 times larger than the integration times 310. Similarly, curves 312 and 314 show respective illumination times for the two types of imaging associated with integration times 308, 310. The lower amount of light required from the illuminator in curves 314 may reduce the total power required for the illuminator, possibly reducing the cost of the illuminator. The sequential series shown by timelines 302, 304 may continue for several frames to provide enough data to enable video tracking and speed measurement of a particular vehicle, in addition to automated license plate recognition (ALPR).

Timing diagrams in FIG. 3B illustrate an example camera and gain timing scheme that is used to alternately provide a properly exposed vehicle image in first frames of a sequential series, and a properly exposed license plate in second frames of the series. As with FIG. 3A, curves 328, 330 on timeline 322 represent first and second camera integration times for the two types of images. On timeline 324, curves 332 and 334 represent differing values of camera gain associated with the integration times 328, 330, respectively. Unlike the example integration time and illumination time values, the gain values 332, 334 vary by magnitude within each frame instead of duration. The gain value 332, 334 may represent, for example, an amount of bias voltage applied to a detector to maximize sensitivity over a particular range of radiance. The gain values 332 (e.g., for vehicle image capture) may be several times higher than gain values 334, which allows the camera to digitally brighten the image of the vehicle. The lower camera gain 334 for the license plate image capture produces an unsaturated, properly exposed image.

It will be appreciated that systems and apparatuses may employ many variations of the implementations shown in FIGS. 3A and 3B. For example, all three of the illustrated parameters (camera integration, illumination time, and camera gain) and any other parameter described herein (e.g., color depth, resolution, focus, etc.) may be varied together for each frame. In another variation, the sequence of two frames with different settings may be extended to three or more sequential frame patterns, where each frame in the patter has different combinations of parameters. In yet other variation, some sets of parameters may be applied more often than others, e.g., in the event that certain image types may need more frames to adequately capture desired data. For example, using FIG. 3A as an example, frames with settings 310, 314 could be repeated twice between one frame with settings 308, 312 if license plate recognition can benefit from relatively more frames than vehicle identification.

Generally, a system and apparatus can be configured to use alternating video frame camera gain to produce properly exposed resolvable license plate and vehicle video and photographic images for vehicle tracking, speed measurement, and automatic license plate recognition. The system and apparatus can also use alternating video frame integration time, illumination pulse width, camera gain, and any other camera parameter to produce properly exposed resolvable license plate and vehicle video and photographic images for vehicle tracking, speed measurement, and automatic license plate recognition.

Figure 4:
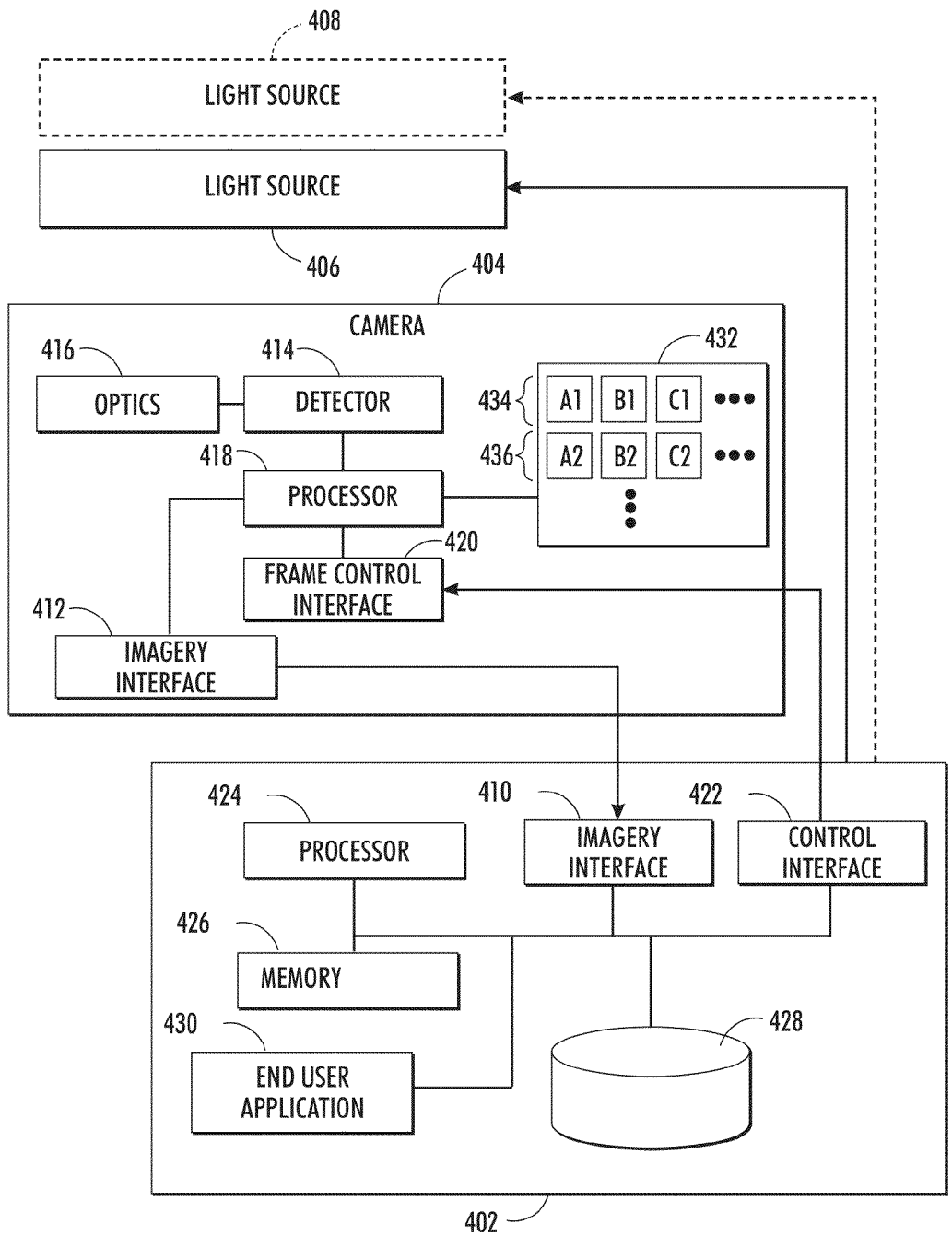
FIG. 4 is a block diagram of a system and apparatus according to an example embodiment.

In reference now to FIG. 4, a block diagram illustrates a system and apparatus according to an example embodiment of the invention. A controller unit 402 may include facilities for controlling one or more cameras 404 and light sources 406, 408. For purposes of this example, both light sources 406, 408 may be dedicated to the camera 404, although at least second light source 408 is optional, as indicated by broken lines. The light sources 406, 408 may illuminate over any wavelength (e.g., infrared, visible) and each light source 406, 408 may have different characteristics (e.g., wavelength, pulse width, power, distance to target, angle from target, etc.) than the other. The controller unit 402 may be physically separate from or integrated with the camera 404 and/or light sources 406, 408. The controller unit 402 may also be coupled to additional cameras (not shown) and respective dedicated light sources (not shown) to provide functions similar to those described below regarding camera 404 and light sources 406, 408.

The controller unit 402 includes an imagery interface 410 that is coupled to a compatible imagery interface 412 of the camera 404. Images captured via a detector 414 and optics 416 of the camera 404 can be communicated via the imagery interface 412, e.g., as a digital video stream. A processor 418 of the camera 404 can facilitate internal processing of the imagery, e.g., capture of images via detector 414, assembly of images into video frames, compression, encoding, transfer of video stream via interface 412, etc. The camera's processor 418 is also shown coupled to a frame control interface 420 that facilitates selective modification of camera parameters on a frame-by-frame basis. As will be described below, the controller unit 402 can access frame control interface 420 via its own control interface 422 to optimize individual frames for rendering particular types of content in different frames.

The aforementioned imagery interface 410 and control interface 422 of the controller unit 402 may be coupled to general-purpose computer hardware such as a processor 424, memory 426, and a database 428. The database 428 may be located within the controller unit 402 (e.g., one or more hard disk drives) and/or be remotely located, e.g., via a network. The database 428 may be used to store imagery obtained via imagery interface 410. The imagery database 428 may be accessed for purposes such as post-processing, analysis, and other end-user needs, as represented by end-user application 430.

Generally, the controller unit 402 may coordinate the operation of the camera 404 with one or more light sources 406, 408 to capture a sequential series of video frames, the frames being captured using two or more parameters that result in at least two subsequent frames being optimized for a different image type. As described above, those types may at least include a specular retroreflective surface such as a license plate, and a non-retroreflective surface such as a vehicle in general. This may be accomplished by instructing the frame control interface 420 to alternate between two different settings of gain, integration time, and/or other parameters, between subsequent frames. These could be coordinated with different illumination times of the light sources 406, 408. The controller unit 402 may control these illumination times via the control interface 422.

As noted above, if one or more of the light sources 406, 408 are co-located with the camera 404, then retroreflective surfaces such as license plates may tend to be overexposed relative to other parts of the image. By reducing illumination time for select frames, either alone or with other camera settings for the same frames, the controller unit 402 can ensure the captured imagery has some frames suitable for detecting license plate data, e.g., license numbers/characters. In another variation, one light source 406 may be co-located with the camera 404, while the other is physically separated from the camera 404, although still positioned to illuminate a target of interest. In such a case, the controller unit 406, 408 could select from between the two light sources 406, 408 depending on the type of image optimization desired.

It should be noted that the illustrated system may also be configured to operate without light sources 406, 408. For example, if there is ample daylight illumination, the camera 404 may be able to sufficiently resolve various types of desired imagery without other light sources. Even where ambient lighting is used, the camera 404 may still vary settings such as gain and integration time between subsequent frames to ensure that those frames are optimal for a particular image type.

The communications between the control interface 422 and frame control interface 420 may utilize known underlying data transport protocols and media, such as those used by networks, device-to-device communications (e.g., serial lines), fiber optics, etc. The settings may be set/updated infrequently, or in real-time. For example, the camera 404 may include a memory register 432 accessible via the frame control interface 420. The register 432 may include a number of slots 434, 436 that can be used to set per-frame parameters. For example, slot 434 may have first parameters A1, B1, C1, etc., applied to a first frame. A subsequent, second frame has second parameters A2, B2, C2, of slot 436 applied. After a last slot is found (e.g., some parameter is set to a null value), the sequence of slots 434, 436 can be started over again and repeated.

In an alternate arrangement, the frame control interface 420 may be used to control parameters in real-time or near-real-time. For example, the controller unit 402 can send a trigger along with a set of parameters (e.g., slot 434) for each frame. The parameters 434 are applied at the same time a frame is captured. This arrangement may require a high bandwidth communication between the control interfaces 420, 422 to ensure the camera 404 can capture data at a desired frame rate.

The controller unit 402 may include features for automatic calibration and adjustment of camera parameters. Calibration/adjustment may be used to account for weather conditions, viewing conditions, equipment variation, etc. For example, two or more indicators (e.g., signs with readable characters) could be mounted in the camera view, one being specular retroreflective and the other not. An application (e.g., user application 430) could over some time period (e.g., at regular intervals) attempt to read the indicators using frames optimized for the appropriate image type, e.g., based on settings values 434, 436. If degradation is detected (e.g., optical character recognition fails to successfully recognize a known string of symbols), then a process of adjusting the parameters 434, 436 may be initiated from the controller unit 402 and/or camera 404. This adjustment may also involve adjusting parameters that affect light sources 406, 408.

Figure 5:
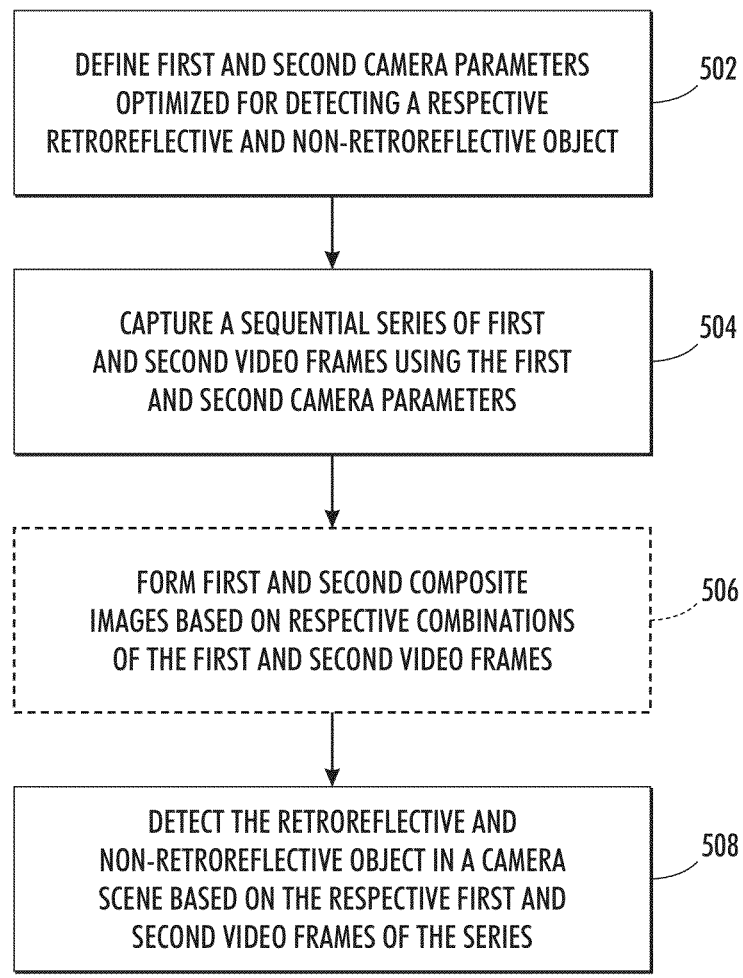
FIG. 5 is a flowchart illustrating procedures according to an example embodiment.

In reference now to FIG. 5, a flowchart illustrates a procedure according to an example embodiment. First and second camera parameters optimized for detecting a respective retroreflective and non-retroreflective object are defined 502. A sequential series of first and second video frames is captured 504 using the first and second camera parameters. Optionally, first and second composite images may be formed 506 based on combinations of the first and second video frames. Whether composite images are formed or not, the retroreflective and non-retroreflective object is detected 508 in a camera scene based on the respective first and second video frames of the series.

The various embodiments described above may be implemented using circuitry, firmware, and/or software modules that interact to provide particular results. One of skill in the arts can readily implement such described functionality, either at a modular level or as a whole, using knowledge generally known in the art. The structures and procedures shown above are only a representative example of embodiments that can be used.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
defining first and second camera parameters optimized for detecting a respective retroreflective and non-retroreflective object, wherein the first and second camera parameters each comprise an illumination time of a light source;
capturing a sequential series of first and second video frames based on the respective first and second camera parameters; and
facilitating detection of the retroreflective and non-retroreflective object in a camera scene based on the respective first and second video frames of the series.

2. The method of claim 1, wherein the first and second video frames are high resolution video frames.

3. The method of claim 2, wherein the high resolution video frames are greater than 300000 pixels.

4. The method of claim 1, wherein the sequential series of the first and second video frames are captured at a frame rate of less than 300 frames per second.

5. The method of claim 1, wherein the retroreflective object comprises a license plate, and the non-retroreflect object comprises a vehicle.

6. The method of claim 5, wherein the camera scene comprises multiple lanes of traffic.

7. The method of claim 1, wherein the first and second camera parameters each comprise one or more of integration time and camera gain.

8. A non-transitory computer readable medium configured with instructions for causing an apparatus to perform the method of claim 1.

9. An apparatus comprising:
a data interface capable of being coupled to a video camera; and
a processor configured to:
define first and second camera parameters optimized for detecting a respective retroreflective and non-retroreflective object; and
cause, via the data interface, the video camera to capture a sequential series of first and second video frames based on the respective first and second camera parameters, wherein the first and second camera parameters each comprise an illumination time of a light source, and wherein the retroreflective and non-retroreflective object are detected in a camera scene based on the respective first and second video frames of the series.

10. The apparatus of claim 9, wherein the sequential series of the first and second video frames are captured at a frame rate of less than 300 frames per second.

11. The apparatus of claim 10, wherein the first and second video frames are high resolution video frames.

12. The apparatus of claim 11, wherein the high resolution video frames are greater than 300000 pixels.

13. The apparatus of claim 9, wherein the retroreflective object comprises a license plate, and the non-retroreflect object comprises a vehicle.

14. The apparatus of claim 13, wherein the camera scene comprises multiple lanes of traffic.

15. The apparatus of claim 9, wherein the first and second camera parameters each comprise one or more of integration time and camera gain.

16. A system comprising:
at least one light source;
a video camera configured to capture a camera scene; and
a controller unit coupled to the video camera and the at least one light source, the controller unit configured to:
define first and second camera parameters optimized for detecting a respective retroreflective and non-retroreflective object in the camera scene;
cause the video camera to capture a sequential series of first and second video frames based on the respective first and second camera parameters; and
facilitate detecting the retroreflective and non-retroreflective object in the camera scene based on the respective first and second video frames of the series; and
vary an illumination time of the at least one light source in accordance with the first and second camera parameters.

17. The system of claim 16 further comprising an end user application configured to detect the retroreflective and non-retroreflective object in the camera scene.

* * * * *